(No Model.)

C. M. COLLINS.
MACHINE FOR WELDING TIRES.

No. 330,875. Patented Nov. 24, 1885.

WITNESSES
Jos. H. Blackwood
R. G. Du Bois

INVENTOR
Charles M. Collins
by W. M. Doolittle
Attorney.

N. PETERS, Photo-Lithographer, Washington, D. C.

UNITED STATES PATENT OFFICE.

CHARLES M. COLLINS, OF SOUTH BEND, INDIANA.

MACHINE FOR WELDING TIRES.

SPECIFICATION forming part of Letters Patent No. 330,875, dated November 24, 1885.

Application filed October 14, 1885. Serial No. 179,890. (No model.)

*To all whom it may concern:*

Be it known that I, CHARLES M. COLLINS, a citizen of the United States, residing at South Bend, in the county of St. Joseph and State of Indiana, have invented certain new and useful Improvements in Machines for Welding Tires; and I do hereby declare the following to be a full, clear, and exact description of the invention, such as will enable others skilled in the art to which it appertains to make and use the same.

My invention relates to certain improvements in machines for welding vehicle-tires by compression, and its object is the production of a machine for welding and finishing tires in a rapid and effectual manner without necessitating any further labor on the part of the attendant than the mere placing of the tire on and against the stationary dies and removing it when finished.

The invention consists in a machine for welding and finishing vehicle-tires, wherein a vertically-movable die-carrying plunger and a horizontally-movable die-carrying plunger, operating alternately, are connected with and actuated by the same moving part of the machine.

The invention also consists in a machine for welding and finishing vehicle-tires, wherein a vertically-movable die-carrying plunger and a horizontally-movable die-carrying plunger are so connected with the actuating part of the machine that the throw given to the vertically-moving plunger will be more than that given to the horizontally-movable plunger.

The invention also consists in the specific construction of the mechanism for connecting the plungers with their operating eccentric.

Figure 1:
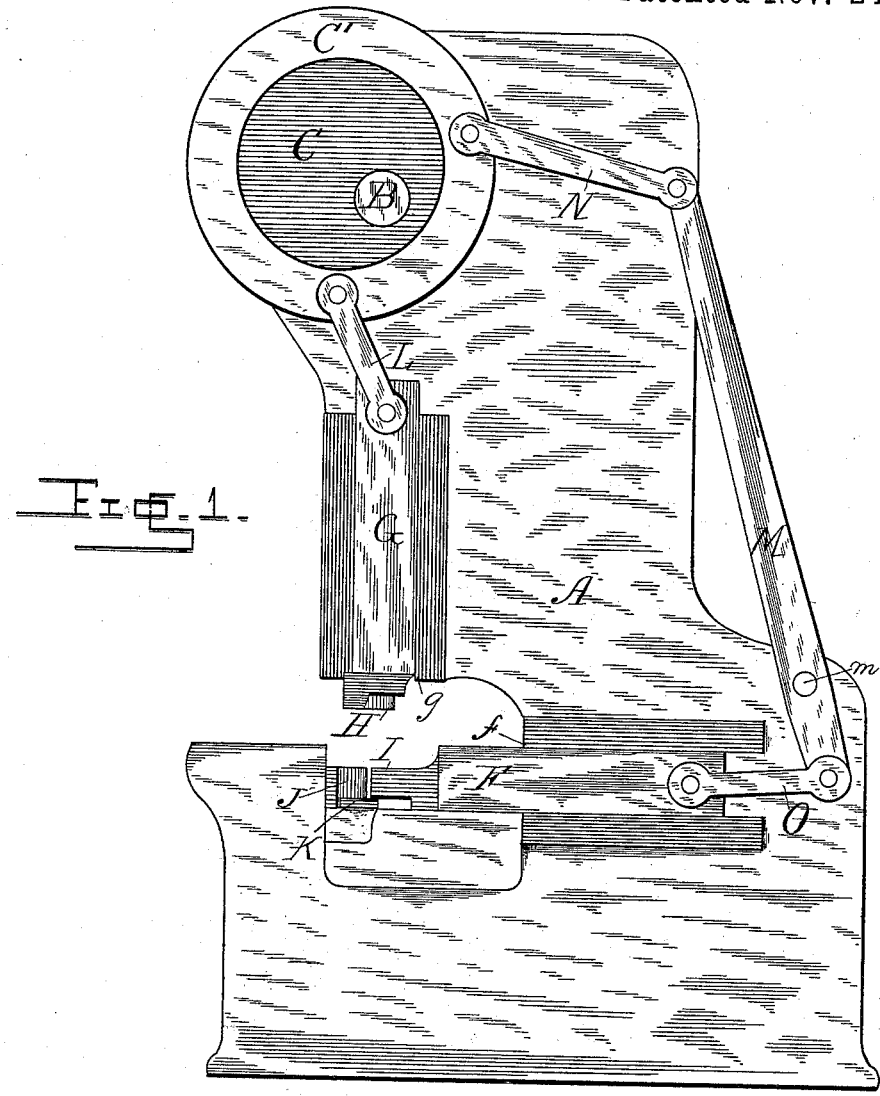
Figure 2:
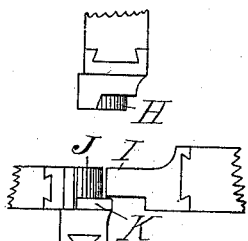
Figure 3:
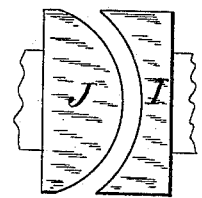

In the accompanying drawings, Figure 1 is a front view of my machine. Figs. 2 and 3 represent the dies detached.

Referring to the drawings, A represents the frame-work of my machine, which may be of any suitable form with reference to the support of the working parts. Through the frame is passed a driving-shaft, B, on which is mounted an eccentric, C, which is encircled by an eccentric-strap, C'. Shaft B is supported at its outer end in a bracket secured to the rear side of frame A, and on the shaft outside the bracket is mounted a band-pulley for an obvious purpose.

F G represent plungers fitted to slide in the ways *f g*, secured to the frame-work of the machine. The inner ends of these plungers are provided with dies H I, adapted to work in connection with stationary dies J K, arranged at a right angle to each other carried in the frame-work, the stationary dies serving as anvils to shape the bottom and one edge of the tire, and the movable dies operating to shape the top and opposite edge of the tire. The dies, it will be observed, are removably attached by means of dovetails, whereby dies suitable to different thicknesses of tire may be readily substituted.

I will now describe the mechanism for giving alternate movement to the plungers, and consequently to the movable dies.

To the upper end of the plunger G is pivotally attached one end of a link, L, whose other end is pivotally attached to the eccentric-strap C'. Loosely bolted to the frame-work of the machine near its top, as at m, and working freely on the bolt as a pivot, is a lever, M, whose long arm is pivotally connected through a link, N, to the eccentric-strap at a point at a right angle to the point of attachment of link L, and whose short arm is similarly connected through another link, O, to plunger F. On an inspection of the drawings it will be observed that links L and N are so positioned on the eccentric-strap as that while plunger G is given a considerable throw plunger F is given but a comparatively short throw. Were the latter plunger given a long throw, the tire might spring from its position on the stationary dies on the outward movement of plunger F.

The operation of my machine is so obvious that further description is deemed unnecessary.

Having thus described my invention, what I claim as new, and desire to secure by Letters Patent, is—

1. In a machine for welding and finishing vehicle-tires, a vertically-movable die-carrying plunger and a horizontally-movable die-carrying plunger connected to and actuated by the same moving part of the machine and operating alternately, substantially as described.

2. The combination, with two stationary dies arranged at a right angle to each other, of two movable dies secured to alternately-operating plungers actuated by the same moving part of the machine, the stationary dies serving as anvils for shaping the bottom and one edge of the tire and the movable dies operating alternately to shape the top and opposite edge of the tire.

3. The combination, with two stationary dies arranged at a right angle to each other, of a vertically-movable die and a horizontally-movable die secured to alternately-operating plungers actuated by the same moving part of the machine, said plungers being so connected with their actuating mechanism that the throw given to the vertically-movable die will be more than that given to the horizontally-movable die.

4. The combination, with two removable stationary dies arranged at a right angle to each other, of two movable dies removably secured to alternately-operating plungers actuated by an eccentric on the driving-shaft of the machine, said plungers being connected with the eccentric-strap by links and a lever, substantially in the manner described.

5. The combination, with the stationary dies J K and eccentric C C', of alternately-operating plungers F G, provided with movable dies H I, links O N and lever M, for connecting the vertically-movable plunger with the eccentric-strap, and link L, for connecting the horizontally-movable plunger with said strap, substantially as described, and for the purposes stated.

In testimony whereof I affix my signature in presence of two witnesses.

CHARLES M. COLLINS.

Witnesses:
J. L. TAYLOR,
A. D. MOORE.